Figure 1:
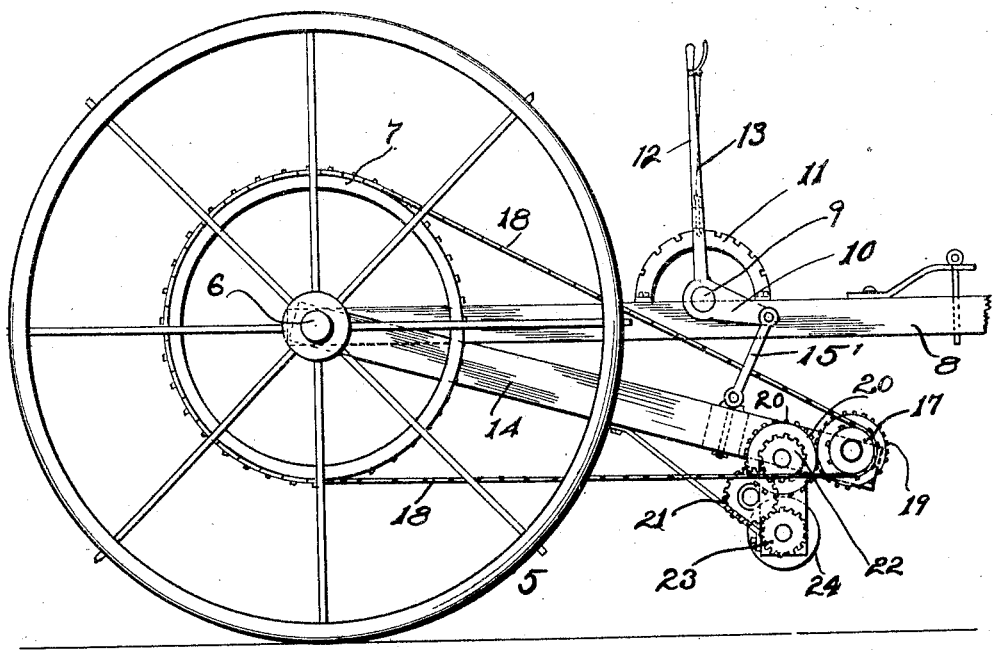

May 19, 1925.

P. N. LARSON

WEED PULLER

Filed June 28, 1923

1,538,829

2 Sheets-Sheet 1

INVENTOR.
Peter N. Larson.
BY
ATTORNEYS.

May 19, 1925.
P. N. LARSON
WEED PULLER
Filed June 28, 1923
1,538,829
2 Sheets-Sheet 2
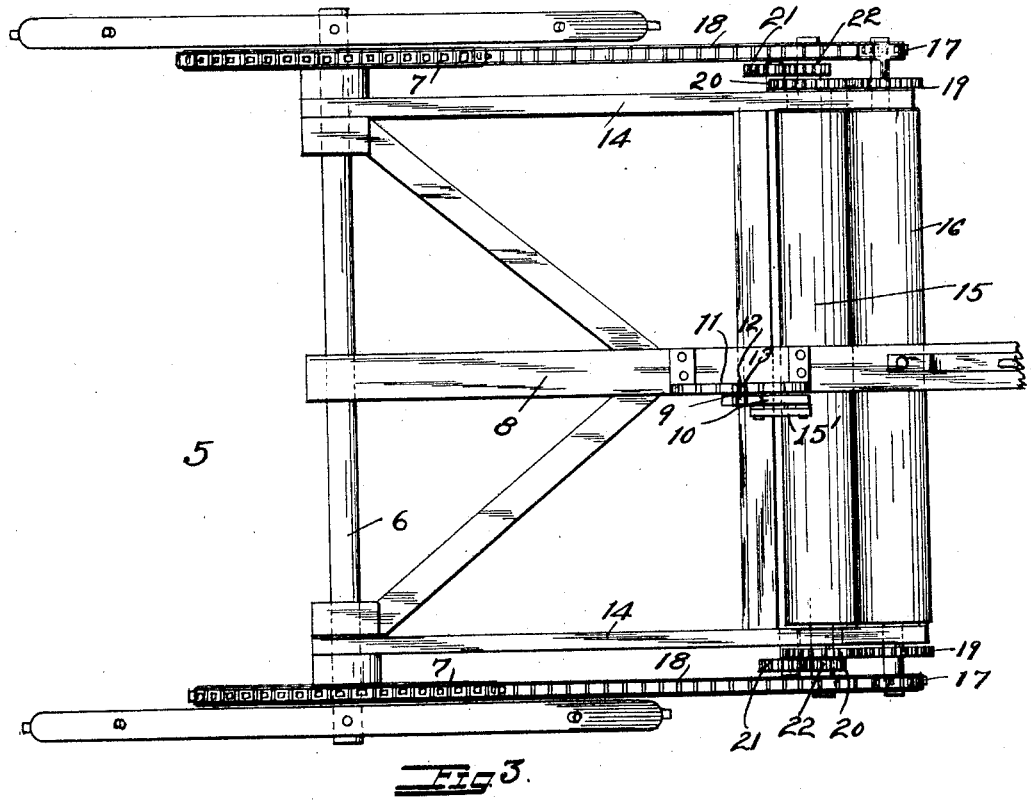
Fig. 3.
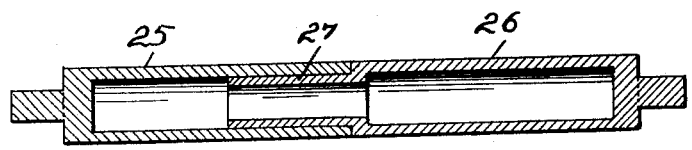
Fig. 4.
INVENTOR.
Peter N. Larson
BY
ATTORNEYS.

Patented May 19, 1925.

1,538,829

UNITED STATES PATENT OFFICE.

PETER N. LARSON, OF STOCKTON, CALIFORNIA.

WEED PULLER.

Application filed June 28, 1923. Serial No. 648,325.

*To all whom it may concern:*

Be it known that I, PETER N. LARSON, a citizen of the United States, and a resident of Stockton, county of San Joaquin, and State of California, have invented a new and useful Weed Puller, of which the following is a specification.

This invention relates to agricultural implements and more particularly to weed pullers and has for its primary object the provision of a novel apparatus of the character which can be readily associated with a suitable wellknown form of wheeled draft frame or vehicle in order that it can be drawn or moved over the field to be treated to the action of the apparatus, and an essential feature of the invention resides in the embodiment of means which will be adjustable to accommodate itself to conditions of a growing crop whereby weeds, as they grow and advance above the crop may be effectively subjected to the action of the invention without damaging the crop in any way whatever.

Another object of the invention is to provide an apparatus of this character which will be exceedingly simple of construction, reliable of action and which will include a plurality of vertically adjustable pulling rolls and a co-acting deflecting roll, the latter serving to guide the weeds into impinging relation to said pulling rolls.

A still further object of the invention is to provide an apparatus of this character which can be manually adjusted to any desired height with respect to the growing crop.

In the drawings:

Figure 1 is view in side elevation of the apparatus.

Figure 2:
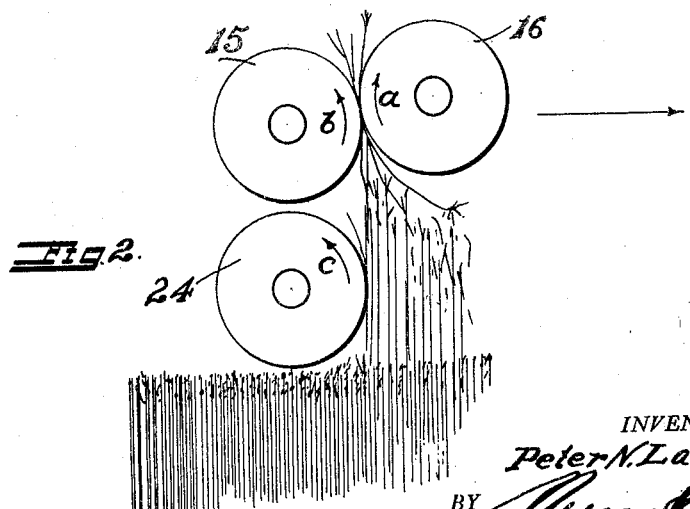

Figure 2 a diagrammatic section of the pulling and deflecting rolls, Figure 3 is a plan view of the apparatus.

Figure 4 is a longitudinal section through one of the pulling rolls.

In carrying the invention into practice I employ a wheeled draft frame or vehicle (5) which may be of any suitable wellknown construction but preferably of the type employing a revolving axle (6) carrying relatively large sprocket gear wheels (7). The frame or vehicle (5) is provided with a draft tongue (8) on which a rocker (9) is mounted. This rocker is provided with a fixed arm (10) and co-acting with the rocker is a rack bar (11), a controlling lever (12) and a locking dog (13). The purpose of this arrangement will be fully referred to hereinafter.

Mounted from the axle (6) so as to tilt in a vertical direction is a frame (14) and as illustrated, said frame is connected to the arm (10) of the rocker (9) by a link (15'), whereby upon adjusting the lever (12) in the customary manner said frame (14) can be moved with respect to the surface of the crop.

Mounted to rotate in the frame (14) are pulling rolls (15) and (16) which are arranged in parallelism as clearly shown in Figure 3 of the drawings. The roll (16) is provided with gear wheels (17) which are connected to the large gear wheel (7) of the axle (6) by power of transmitting chains (18). In this manner it will be observed that when the axle (6) is placed in rotation power therefrom is immediately transferred to the aforesaid roll (16). Said roll (16) is provided with gear wheels (19) which are in mesh with similar gear wheels (20) on the the roll (15). Idle gears (21) are arranged in intermeshing engagement with gear wheels (22) on the roller (15) and gear wheels (23) on a lower deflecting roll (24), the latter being preferably disposed in vertical alignment with the pulling roll (15). From the foregoing description it will be appreciated that when power is supplied to the roll (16) to revolve same in the direction of arrow "*a*" in Figure 2, power will be transferred to the co-pending pulling roll (15) to revolve the latter in the direction of the arrow "*b*." Through the employment of the idle gear (21) which meshes with the gears (22) and (23) it will be seen that motion is transferred to the deflecting roll (24) to revolve same in the direction of the arrow "*c*." It now follows that the pulling rolls (15) and (16) revolve in opposite directions and that the deflecting roll (24) revolves in the same direction as the pulling roll (15).

In operation it shall be assumed upon reference to Figure 2 that the frame or vehicle (5) is being propelled down a row of wheat or the like and that the frame (14) has been set or adjusted to ride directly above the growing crop. This disposes the roll "*c*" where it is permitted to be brought into effective touch or contact with weeds growing above the crop and as the machine (5) proceeds down the row these weeds are deflected by the roll (24) as diagrammatically illustrated in Figure 2 causing same to be knotted and caught by the roll (24) and deflected into the space between the mating pulling rolls (15) and (16). These rolls may be of any suitable wellknown construction that may be best adapted for the purpose intended. In other conditions they may be corrugated or they may be rubber coated as found desirable. Incident to the manner in which the roll (24) functions and due to the fact that the aforesaid rolls (15) and (16) revolve respectively in opposite directions it will be seen that weeds to be extracted are subjected to an effective pulling action incident to an impingement between said rolls (15) and (16). As the machine progresses down the field the extracted weeds are discharged at a point above said rolls (15) and (16) and same may be collected and discharged upon a suitable endless carrier, not shown, or same may be conveyed into a receptacle located at a point behind said rolls (15) and (16). I do not lay any particular stress upon this manner of taking care of the weeds after they are extracted by the rolls (15) and (16) as any suitable wellknown equipment may be employed for this purpose.

Upon reference to Figure 3 it will be observed that each of the rolls (15), (16) and (24) is positively driven at its opposite ends in order that these rolls may be driven at compensating movements I preferably construct them of sections (25) and (26) which are telescopically joined together at (27). The purpose of this construction is to cause the rolls or the sections thereof to compensate themselves to varying speeds as the vehicle or frame (5) turns around at the end of the rows. The construction of the rolls is such that the sections thereof may revolve at relatively different speeds.

I claim:

1. A weed puller comprising a pair of oppositely driven co-acting rolls, occupying substantially the same horizontal plane, and a deflector correlated to said rolls and arranged in the same vertical plane with one of said rolls to cause the weed to be deflected into the space between said co-acting rolls for effective pulling engagement therewith.

2. A weed puller comprising a pair of oppositely driven co-acting rolls, occupying substantially the same horizontal plane, and a deflector correlated to said rolls and arranged in the same vertical plane with one of said rolls to cause the weed to be deflected into the space between said co-acting rolls for effective pulling engagement therewith, and a tilting frame carrying all of said rolls.

3. A weed puller comprising a pair of oppositely driven co-acting rolls, occupying substantially the same horizontal plane, and a deflector correlated to said rolls and arranged in the same vertical plane with one of said rolls to cause the weed to be deflected into the space between said co-acting rolls for effective pulling engagement therewith, and a draft frame carrying all of said rolls.

4. A weed puller comprising a pair of oppositely driven co-acting rolls, and a deflector correlated to said rolls and in vertical alinement with one of said rolls to cause the weed to be deflected into the space between said co-acting rolls for effective pulling engagement therewith, a draft frame carrying all of said rolls, and means on said frame for raising and lowering said rolls together.

5. A weed puller comprising a pair of oppositely driven co-acting rolls, occupying substantially the same horizontal plane, and a deflector correlated to said rolls and arranged in the same vertical plane with one of said rolls to cause the weed to be deflected into the space between said co-acting rolls for effective pulling engagement therewith, a draft frame carrying all of said rolls, means on said frame for raising and lowering said rolls together and means for positively driving all of said rolls.

6. A weed puller comprising a pair of oppositely driven rolls, and a deflector roll arranged in co-acting relation thereto, each of said rolls consisting of independently driven sections, and means for driving said sections.

7. A weed puller comprising a portable wheeled frame, a tilting frame hung from the axle of said portable frame, a pair of pulling rolls on said tilting frame, and a revolving weed deflector correlated to said pulling rolls and disposed in vertical alinement with one of said rolls.

8. A weed puller comprising a portable wheeled frame, a tilting frame hung from the axle of said wheeled frame, means for raising and lowering said tilting frame, a plurality of co-acting substantially horizontally alined weed pulling rolls on said tilting frame, means for driving said rolls as the wheeled frame is moved over a field, and a revolving weed deflector co-acting with said rolls and arranged in vertical alinement with one of said rolls.

9. A weed puller comprising a plurality of positively driven co-acting smooth rolls moving respectively in opposite directions, and a smooth deflector roll underlying one of said first named rolls and revolving in the same direction therewith.

10. A weed puller comprising a plurality of positively driven co-acting smooth substantially horizontally alined rolls moving respectively in opposite directions, and a deflector roll underlying one of said first named rolls in vertical alinement thereto and revolving in the same direction therewith, and means for raising and lowering all of said rolls together.

PETER N. LARSON.